(12) United States Patent
Sato (10) Patent No.: US 6,633,556 B1
(45) Date of Patent: Oct. 14, 2003

(54) MOBILE COMMUNICATIONS SYSTEM AND MOBILE COMMUNICATIONS METHOD

(75) Inventor: Takaaki Sato, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/147,832

(22) PCT Filed: Jul. 16, 1998

(86) PCT No.: PCT/JP98/03201

§ 371 (c)(1),
(2), (4) Date: Mar. 16, 1999

(87) PCT Pub. No.: WO99/04513

PCT Pub. Date: Jan. 28, 1999

(30) Foreign Application Priority Data

Jul. 19, 1997 (JP) ............................................. 9-209639

(51) Int. Cl.⁷ ............................................. H04B 7/216
(52) U.S. Cl. ........................ 370/332; 370/335; 370/342
(58) Field of Search .................................. 370/331, 332, 370/335, 342, 441, 329; 455/436, 437, 440

(56) References Cited

U.S. PATENT DOCUMENTS

| | | | |
|---|---|---|---|
| 5,487,083 A | | 1/1996 | Nakajima et al. |
| 5,649,000 A | * | 7/1997 | Lee et al. .................... 370/331 |
| 5,848,063 A | * | 12/1998 | Weaver, Jr. et al. ........ 370/331 |
| 5,987,013 A | * | 11/1999 | Kabasawa .................. 370/331 |
| 6,021,123 A | * | 2/2000 | Mimura ...................... 370/331 |

FOREIGN PATENT DOCUMENTS

| | | |
|---|---|---|
| EP | 0566551 | 10/1993 |
| EP | 0873034 | 10/1998 |
| EP | 0933955 | 8/1999 |
| JP | 6326653 | 11/1994 |
| JP | 7-50870 | 2/1995 |
| JP | 9187055 | 7/1997 |
| JP | 9284827 | 10/1997 |
| JP | 10136425 | 5/1998 |
| WO | 93/21699 | 10/1993 |
| WO | 97/44983 | 11/1997 |
| WO | 98/54916 | 12/1998 |

OTHER PUBLICATIONS

An English Language abstract of JP 6–326653.
An English Language abstract of JP 10–136425.
An English Language abstract of JP 9–284827.
An English Language abstract of JP 7–050870.
An English Language abstract of JP 9–187055.

* cited by examiner

Primary Examiner—Chau Nguyen
Assistant Examiner—Soon-Dong Hyun
(74) Attorney, Agent, or Firm—Greenblum & Bernstein, P.L.C.

(57) ABSTRACT

Even in a case where a using frequency differs for each region of a service area, a mobile direction of a mobile station M is determined by a mobile direction determination section 115 in a network side (control station), and whether or not the mobile station M moves out of the same frequency area is determined by a determination section 116 for an outer area of the same frequency, and the using frequency is changed in advance by a frequency change section 104 of the mobile station

8 Claims, 5 Drawing Sheets

FIG. 1

PRIOR ART

MOBILE COMMUNICATIONS SYSTEM AND MOBILE COMMUNICATIONS METHOD

TECHNICAL FIELD

The present invention relates to a mobile station apparatus and a base station apparatus for performing data transmission of a CDMA (Code Division Multiple Access) system and a communication method using these apparatus.

BACKGROUND ART

In a mobile communication system of third generation, a CDMA system is planning to be used as a radio access system. Generally, in the CDMA system, a spreading code peculiar to each radio cell (radio base station) is used to a radio signal (forward link), which each radio base station transmits. Also, a spreading code peculiar to each mobile station is used with respect to a radio signal (reverse link), which each mobile station transmits.

In the CDMA system, an advantage in which the same frequency can be used between the adjacent radio cells (hereinafter referred to as cell as required) is exploited and a soft handover system is adopted as a handover system, which is used when the mobile station moves between cells. The soft handover system combines radio signals from the base station of the mobile source cell and the base stat on of the mobile destination cell.

In order to execute such a handover, the mobile station need to perform a peripheral cell search for searching the base station of the mobile destination cell. Each base station always transmits a radio channel, which is called perch channel. The perch channel is transmitted from each cell (base station) using an inherent spreading code.

Therefore, each station notifies the mobile station of the spreading code, which is used in the peripheral cells, of the self-station as broadcast information. On the other hand, the mobile station periodically detects a link quality (reception SIR (signal interference ratio) of the radio channel (perch channel of the peripheral cell) using the notified spreading code. Or, the mobile station periodically detects reception Eb/IO (a ratio of energy of a received signal per one bit to interference, a heat control power spectrum density ratio) Then, the mobile station notifies the network side of the detection result. By performing the so-called peripheral cell search, the network can determine to which cell the mobile station is moving.

Figure 1:
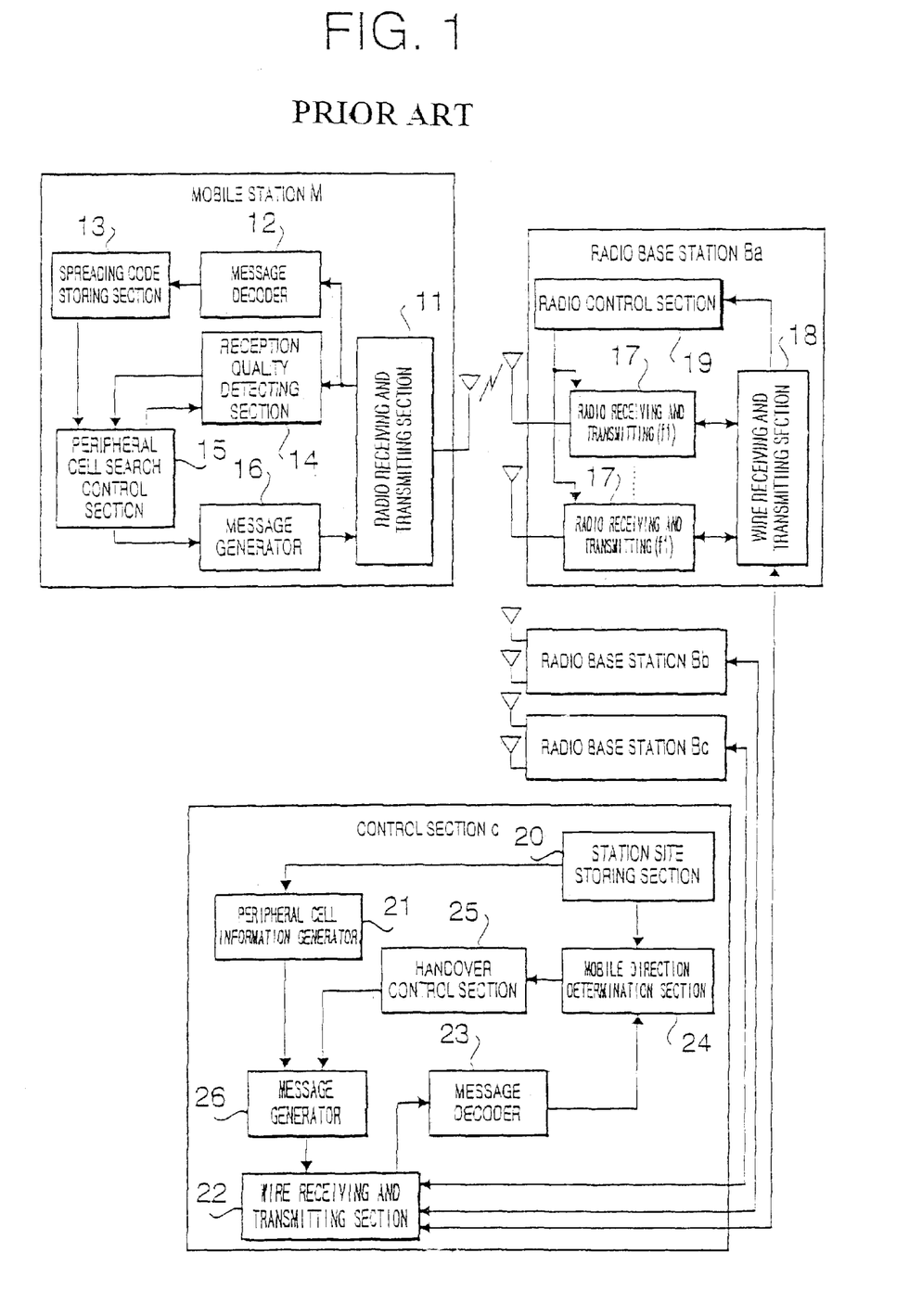
FIG. 1 is a block diagram showing an outline structure of a conventional mobile communication system.

FIG. 1 is a view showing an outline structure of a conventional mobile communication system, particularly the structure relating to the handover. The mobile communication system mainly comprises a mobile station, radio base stations and a control station.

A mobile station M mainly comprises a radio receiving and transmitting section 11, a message decoder 12, a spreading code storing section 13, a reception quality detecting section 14, a peripheral cell control section 15, and a message generator 16. The radio receiving and transmitting section 11 receives and transmits a radio signal between the mobile station M and the radio base station. The message decoder 12 decodes control information contained in the signal received by the radio receiving and transmitting section 11. The spreading code storing section 13 stores spreading codes of an object to be subjected to the peripheral cell search designated from the network side, that is, the spreading codes used in the peripheral cells. The reception quality detecting section 14 detects the link quality of the signal received by the radio receiving and transmitting section 11. The peripheral cell search control section 15 sets the spreading codes stored in the spreading code storing section 13 to be used in the peripheral cells with respect to the reception quality detecting section 14, sequentially. Then, the peripheral cell search control section 15 manages the reception quality detecting cycle, and the number of times of detection, and provides an averaging processing to the detection result. The message generator 16 generates a message, including control information, to the network.

The radio base stations B mainly comprise a plurality of radio receiving and transmitting sections 17, a wire receiving and transmitting section 18, and a radio control section 19. The radio receiving and transmitting sections 17 receive and transmit the radio signals between the mobile station and the radio base station. The wire receiving and transmitting section 18 receives and transmits control signals, that is, a mobile station control signal and a radio base station control signal between the control station and the radio base stations B via radio. The radio control section 19 controls the radio receiving and transmitting sections 17 in accordance with a designation from the control station. A plurality of radio base stations Ba, Bb, and Bc thus structured is provided.

The control section C mainly comprises a station site storing section 20, a peripheral cell information generator 21, a wire receiving and transmitting section 22, a message decoder 23, a mobile direction determination section 24, a handover control section 25, and a message generator 26. The station site storing section 20 stores the inherent spreading code, which is used by the radio base station under the control of the self-station. The peripheral cell information generator 21 generates peripheral cell information for each radio cell based on station site information stored in the station site storing section 20. The wire receiving and transmitting section 22 receives and transmits control signals, which are received and transmitted from/to the radio base stations Ba, Bb, and Bc. The message decoder 23 decodes control information from the mobile station. The mobile direction determination section 24 determines a mobile destination cell of the mobile station based on a peripheral cell search result report from the mobile station and information from the station site storing section 20. The handover control section 25 designates the execution of the handover to the mobile station M and the radio base stations B when it is determined that the handover is needed based on information from the mobile direction determination section 24. The message generator 26 generates a message including control information on the mobile station M and the radio base stations B.

Figure 2:
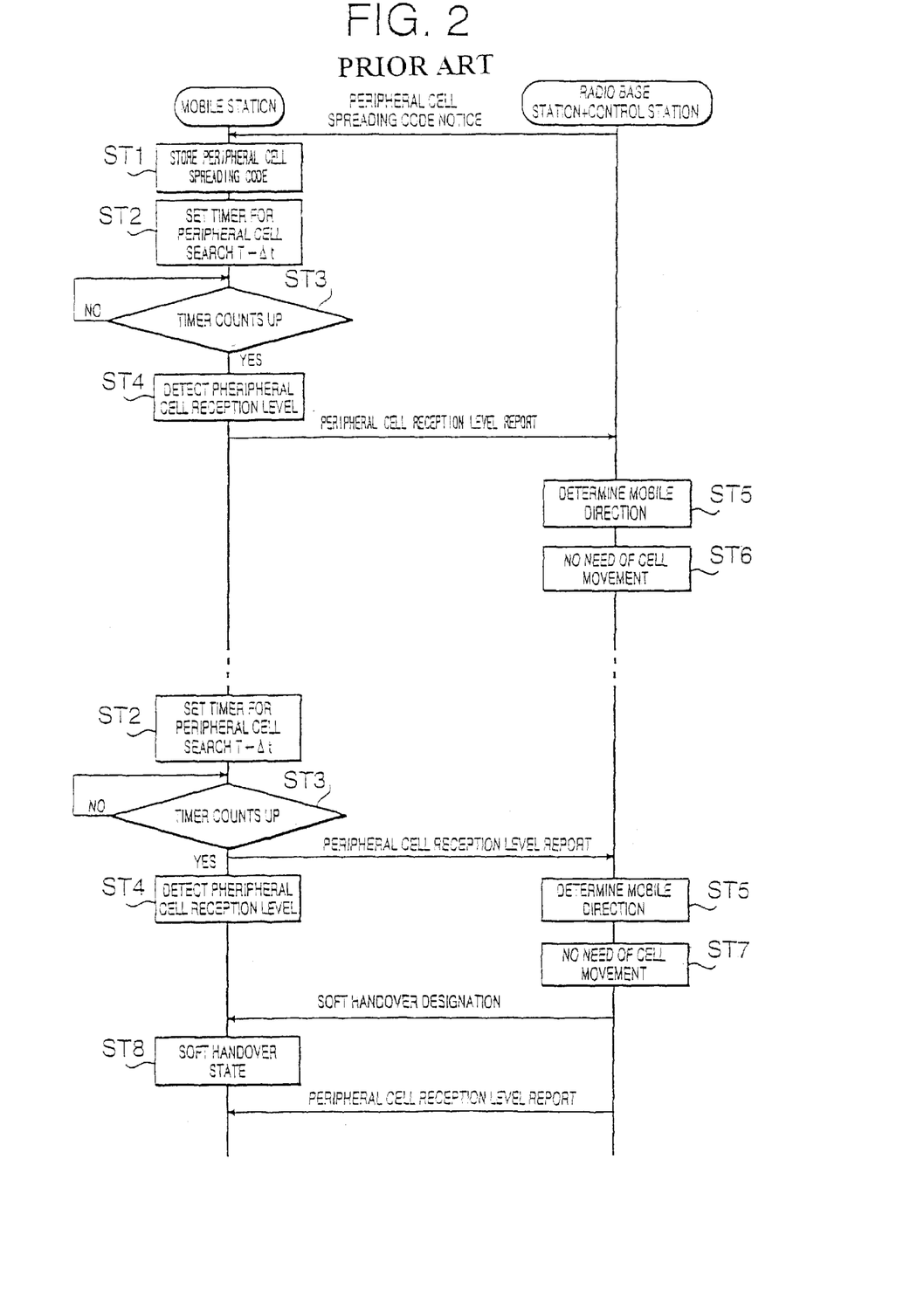
FIG. 2 is a sequence view of the conventional mobile communication system.

Next, an operation of the handover of the above-structured conventional mobile communication system will be explained with reference to FIG. 2.

The spreading code which each radio base station uses as a reverse link is set in advance, and information on the spread code setting is managed by the station site storing section of the control station.

The radio control section 19 of the radio base station Ba uses a predetermined spreading code Ca as a forward link, and the mobile station M uses a spreading code Cm peculiar to the mobile station as a reverse link.

The mobile station M is in a cell area. The mobile station M receives a peripheral cell spreading code notice from the radio base station Ba offering a service of the cell a, so that the spreading codes used in the peripheral cells are stored in the spreading code storing section 13 (ST1).

The peripheral cell search control section 15 sets a cell search execution cycle Δt in a timer T (ST2). Then, when the timer counts up (ST3), the spreading codes, which are used by the peripheral cells stored in the spreading code storing section 13, are sequentially set in the reception quality detecting section 14. The reception quality detecting section 14 detects the reception quality from the peripheral cells of the radio base station Ba (ST4).

Next, the peripheral cell search result is reported to the network. The above explained a case in which the peripheral call search result was reported to the network every time when each peripheral cell search was executed. However, the result is not necessarily reported to the network every time.

The mobile direction determination section 24 of the control station C first determines the mobile direction based on the peripheral cell reception quality report from the mobile station M (ST5) to determine whether or not the cell movement is needed. If it is determined that the cell movement is not needed (ST6) control information is not transmitted to the mobile station. For this reason, the reception quality from the periphery cell is detected again (ST4).

If it is determined that the cell movement is needed as a result of determination of the mobile direction (ST5) that is, the mobile station M is moving to a cell b from the cell a, the following operation is executed. More specifically, the start of the forward link transmission to the mobile station M and that of the reverse link reception from the mobile station M are designated to the radio base station Bb offering a service of the cell b. This operation is called soft handover designation.

After that, the mobile station M is moved to the cell through the soft handover state (ST8). Thereafter, the control station notifies the mobile station of the spreading code used in the peripheral cells of the cell b.

Thus, in the case in which the same frequency is used between the adjacent cells, the handover is executed by performing the peripheral cell search in the mobile station and by reporting the result to the network.

The CDMA system can cover the whole service area using only a single frequency since the same frequency can be used between the adjacent cells. However, in the CDMA system, there is an upper limitation since the number of users, which can be contained by use of one frequency, is determined by an amount of interference.

On the other hand, in order to increase the number of users per cell, a plurality of frequencies must be used. In the service area to which the mobile communication system is applied, there are various areas including an extremely high traffic area such an urban area to a low traffic area such as a suburban area. The frequency suitable for an amount of traffic, which is required in each area, is preferably used. Therefore, in the service area, the handover must be realized after the frequency to be used in each area can be freely set.

However, the mobile communication system is predicated on the point that the same frequency is used in the entire service area. If the mobile communication system is used in the service area having a different frequency, there occurs a problem in which the handover cannot be satisfactorily performed between the cells each having a different frequency.

DISCLOSURE OF THE INVENTION

The present invention has been made in consideration of the above-mentioned problem. An object of the present invention is to provide a mobile communication system capable of satisfactorily performing an handover even in service areas each having a different frequency, and to provide a mobile communication method.

The above object can be achieved by changing the using frequency in advance when a mobile direction of a mobile station M is determined in a network side (control station) and it is further determined whether or not the mobile station M moves out of the same frequency area, and when the mobile station M moves out of the same frequency area.

BEST MODE FOR CARRYING OUT THE INVENTION

In the mobile communication system according to the embodiment of the present invention, there is used the structure for a first frequency to a second frequency in a mobile station apparatus to execute data receiving and transmitting of a CDMA system when a radio cell search is performed from a first radio cell communicating at the first frequency to a second radio cell communicating at the second frequency different from said first frequency.

In the mobile communication system according to the embodiment of the present invention, there is used the structure for changing a first frequency to a second frequency in a mobile station apparatus to execute data receiving and transmitting of a CDMA system before a cell movement is performed from a first radio cell communicating at the first frequency to a second radio cell communicating at the second frequency different from the first frequency.

In the mobile communication method according to the embodiment of the present invention, there is used the structure for changing a first frequency to a second frequency in a mobile station apparatus to execute data receiving and transmitting of a CDMA system before a cell movement is performed from a first radio cell communicating at the first frequency to a second radio cell communicating at the second frequency different from the first frequency.

According to the above structure, even in a case where the using frequency differs for each region of the service area, a handover can be executed between cells each using a different frequency.

Also, in the embodiment of the present invention, there is used the structure in which the frequency change is performed when a radio cell of a mobile destination is the first radio cell contacting the second radio cell. Also, in the embodiment of the present invention, there is used the structure in which it is determined whether or not the mobile station apparatus moves out of the frequency area when a radio cell of a mobile destination is a first radio cell for setting the first frequency contacting a second radio cell for setting the second frequency.

According to the above structure, the frequency change is performed when the cell of the mobile destination is a boundary cell between the first and second radio cells. As a result, the first frequency can be surely changed in advance to the second frequency set by the second radio cell, and the handover between the cells each having a different frequency can be stably executed.

In the mobile communication method according to the embodiment of the present invention, there is used the structure for changing for changing a first frequency to a second frequency different from the first frequency in a mobile station apparatus to execute data receiving and transmitting of a CDMA system when it is determined in a frequency area where communications are performed at the first frequency whether or not the mobile station apparatus moves out of said frequency area and when the mobile station apparatus moves out of the frequency area. As a result, the handover between the cells each having a different frequency can be stably executed.

Note that a communication terminal apparatus used in the mobile communication system such as a mobile station apparatus and a base station apparatus are included in the present invention.

An embodiment of the present invention will now be described with reference to the accompanying drawings.

According to the present invention, even in a case where the using frequency differs in each region of the service area, it is determined whether a mobile station moves in an area where the same frequency can be used or in an area where the same frequency cannot be used in a network side (control station), and the frequency is switched by the mobile station in advance. This can provide a mobile communication system, which can execute a handover between cells each having a different using frequency.

Figure 3:
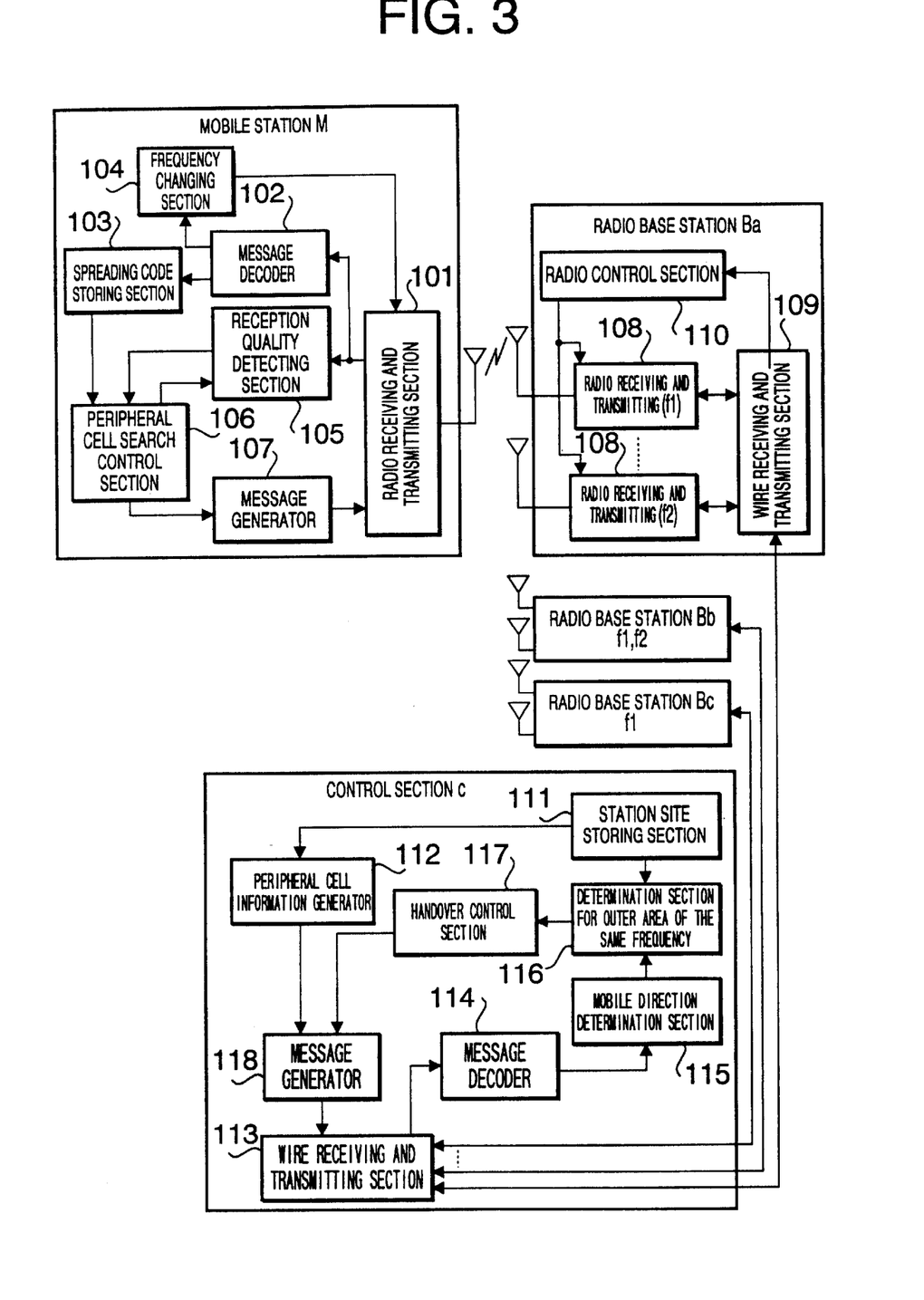
FIG. 3 is a block diagram showing an outline structure of a mobile communication system according to one embodiment of the present invention.

FIG. 3 is a block diagram showing an outline structure of the mobile communication system according to one embodiment of the present invention. The mobile communication system comprises a mobile station M, radio base stations Ba, Bb, Bc, and a control station C.

In the mobile station M, a radio receiving and transmitting section 101 receives and transmits radio signals from/to the radio base stations. A message decoder 102 decodes control information included in the signals received by the radio receiving and transmitting section 101. A spreading code storing section 103 stores spreading codes of an object to be subjected to the peripheral cell search designated from the network side, that is, the spreading codes used in the peripheral cells.

A frequency changing section 104 changes a frequency to be set in the radio receiving and transmitting section 101 by a designation from the control station C. A reception quality detecting section 105 detects a link quality (reception level) of the signal received by the radio receiving and transmitting section 101. A peripheral cell search control section 106 sets the spreading codes stored in the spreading code storing section 103 to be used in the peripheral cells with respect to the reception quality detecting section 105, sequentially. Then, the peripheral cell search control section 106 manages the reception quality detecting cycle, and the number of times of detection, and provides an averaging processing to the detection result. A message generator 107 generates a message including control information to the network.

In each of the radio base stations Ba, Bb, and Bc, a radio receiving and transmitting sections 108 receive and transmit radio signals between the radio base stations and the mobile station M. A wire receiving and transmitting section 109 receives and transmits control signals, that is, a mobile station control signal and a radio base station control signal between the control station C and the radio base stations via radio. A radio control section 110 controls the radio receiving and transmitting sections 108 in accordance with a designation from the control station C. Note that the radio receiving and transmitting sections 108 of the radio base stations can set a different frequency, respectively. In this embodiment, frequencies f1 and f2 are used in the radio base stations Ba and Bb, and only frequency f1 is used in the radio base station Bc.

In the control station C, a station site storing section 111 stores an inherent spreading code, which the radio base station under the control of the self-station uses. A peripheral cell information generator 112 generates peripheral cell information for each cell based on station site information stored in the station site storing section 111. A wire receiving and transmitting section 113 receives and transmits control signals, which are received and transmitted from/to the radio base stations.

A message decoder 114 decodes control information from the mobile station M. A mobile direction determination section 115 determines a mobile destination cell of the mobile station M based on a peripheral cell search result report from the mobile station M and information from the station site storing section 111. A determination section 116 for an outer area of the same frequency determines whether or not the mobile station M moves out of the same frequency area based on mobile destination cell information from the mobile direction determination section 115 and information from the station site storing section 111.

When it is determined that a handover is needed based on information from the mobile direction determination section 115, a handover control section 117 designates the execution of the handover to the mobile station M and the radio base stations. When it is determined that a frequency change is needed based on information from the determination section 116 for an outer area of the same frequency (a case in which the mobile station M moves out of the same frequency area), the handover control section 117 designates the following execution. More specifically, the handover control section 117 designates the execution of the frequency change (hard handover in the cell) to the mobile station M and the radio base stations. A message generator 118 generates a message including control information on the mobile station M and the radio base stations.

Figure 4:
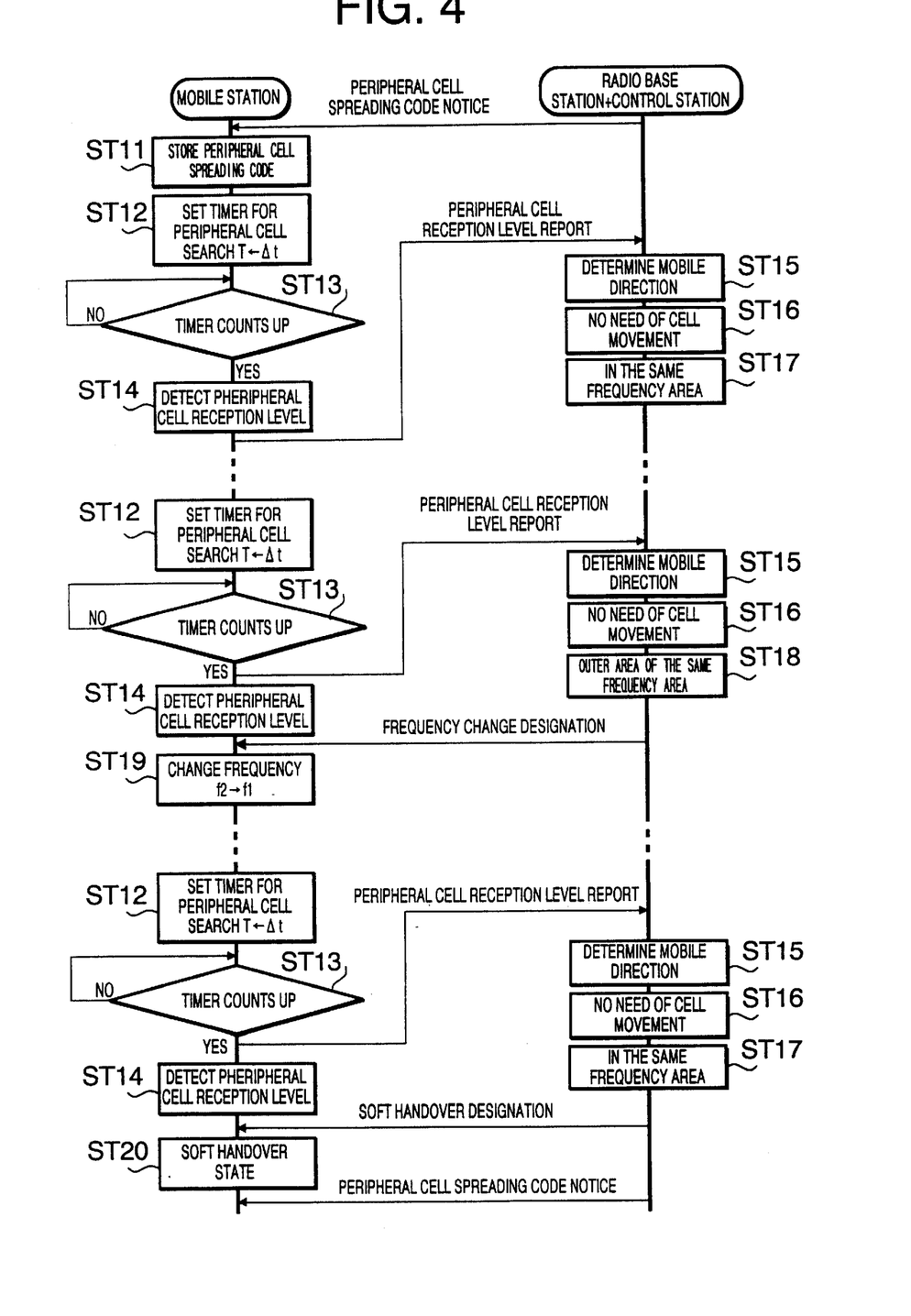
FIG. 4 is a sequence view of the mobile communication system according to one embodiment of the present invention.
Figure 5:
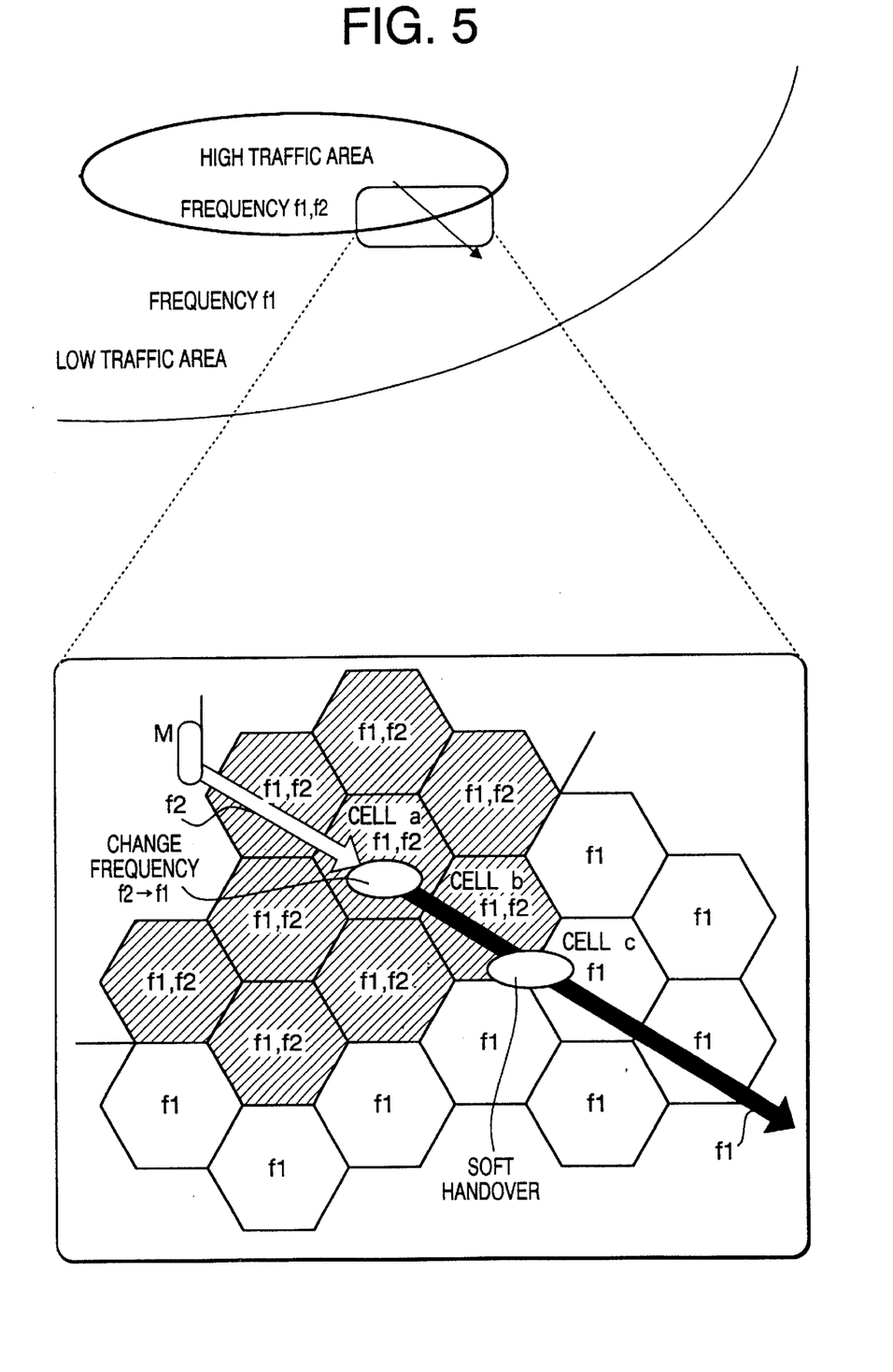
FIG. 5 is a view explaining a mobile communication method of the present invention.

Next, the following will explain a case in which the handover is actually executed in the above-structured mobile communication system. FIG. 4 is a sequence view showing an operation of the mobile communication system according to one embodiment of the present invention. FIG. 5 is a view showing the relationship between a mobile path of the mobile station M and the cell (radio base station) according to one embodiment of the present invention. The following will explain a case in which a mobile station M2 uses frequency f2 (first frequency) in a high traffic area shown in FIG. 5, and changes the frequency to frequency f1 (second frequency) in moving to the low traffic area during communications.

The spreading code which each radio base station uses as a forward link is set in advance. Information of the setting is managed by the station site storing section 111 of the control station. Then, the peripheral cell information generator 112 generates peripheral cell information of each cell based on the station site information stored in the station site information storing section 111.

The radio control section 110 of the radio base station Ba uses a predetermined spreading code Ca as a forward code. The mobile station M uses a spreading code Cm peculiar to the mobile station as a reverse link.

Between the mobile station M and the control station C, the message such as control information generated by the message generator 107 of the mobile section M is sent to the radio receiving and transmitting section 108 of the base stations B from the radio receiving and transmitting section 101 of the mobile station M, and further sent to the wire receiving and transmitting section 113 of the control station C through the wire receiving and transmitting section 109. Then, the message is decoded by the message decoder 114 of the control station C.

On the other hand, the message such as control information generated by the message generator 118 of the mobile control station C is sent to the wire receiving and transmitting section 109 of the base stations B from the wire receiving and transmitting section 113 of the control station C, and further sent to the radio receiving and transmitting section 101 of the mobile station M through the radio receiving and transmitting section 108. Then, the message is decoded by the message decoder 102 of the mobile station M, and sent to the spreading code storing section 103 and the frequency changing section 104.

The mobile station M is in the cell a area, which is a first radio cell in which two frequencies f1 and f2, including the first frequency f2, are set by the radio receiving and transmitting section 108. The mobile station M receives a peripheral cell spreading code notice from the radio base station Ba offering a service of the cell a. As a result, the spreading codes used in the peripheral cells are stored to the spreading code storing section 103 (ST11).

The peripheral cell search control section 106 sets a cell search execution cycle Δt in a timer T (ST12) Then, when the timer counts up (ST13), the spreading codes, which are used by the peripheral cells stored in the spreading code storing section 103, are sequentially set in the reception quality detecting section 105. The reception quality detecting section 105 detects the reception quality such as a reception level from the peripheral cells of the radio base station Ba (ST14).

Next, the peripheral cell search result is reported to the network. The above explained a case in which the peripheral call search result was reported to the network every time when each peripheral cell search was executed. However, the result is not necessarily reported to the network every time.

The mobile direction determination section 115 determines the mobile direction of the mobile station M based on the peripheral cell search result report from the mobile station M (ST15). As one example of the determination methods, the mobile direction determination section 115 selects the highest reception quality from the reception quality levels L1, L2, . . . , Ln sent from the respective cells Z1, Z2, . . . Zn included in the peripheral cell reception quality report from the mobile station M, and determines the selected highest reception quality as the mobile direction. In other words, if the reception quality level Lk of the cell Zk is the highest, it is determined that the mobile destination cell is Zk.

Moreover, the mobile direction determination section 115 determines whether or not the cell movement is needed. As one example of the determination methods, the mobile station M compares a level difference between the reception quality Levels L0 and Lk, which have been sent from the cell Z0 during communications, with a threshold value ΔLT for determination of the cell movement. If the comparison result is ∎L0−Lk∎>LT, it is determined that the cell movement is needed. If the comparison result is ∎L0−Lk∎≦LT, it is determined that the cell movement is not needed.

If it is determined that the cell movement is not needed (ST16), the determination section 116 for an outer area of the same frequency determines whether or not the mobile destination cell Zk, which has been determined by the mobile direction determination section 115, is a boundary of the area where the frequency f2 is used. This determination is executed based on information on setting the frequency used in each cell, whereby determining whether or not the cell moves out of the same frequency area, that is the area where the frequency f2 can be used (ST17, ST18). Moreover, it is determined whether or not the frequency change is needed in the control station C based on the above determination result.

The determination whether or not the cell moves out of the same frequency area is performed when the radio cell search is executed to a cell c, which is the second radio cell in which only frequency f1 is set, from the cell a, which is the first radio cell, or the cell b. Also, the above determination may be performed before the cell movement from the first cell a or the cell h to the second radio cell c.

Moreover, the above determination may be performed based on the designation from the mobile direction determination section 115 when the radio cell of the mobile destination is the first radio cell contacting the second radio cell. In this case, since the frequency f2 can be surely changed to the frequency f1 set by the second radio cell in advance, the handover between the cells each having a different frequency can be stably executed. In other words, the peripheral cell reception quality is reported in the process where the mobile station M moves from the cell a to the cell b in FIG. 5. As a result, the network can recognize that the mobile station M is moving to the cell A, which is the boundary cell of the area (in the same frequency area) using f2.

Next, if it is determined that the frequency change is needed, the control station C designates the receiving and transmitting using the frequency f1 to the radio base station Ba. Thereafter, the control station C designates the frequency change to the mobile station M (cell a of FIG. 5). The mobile station M changes the frequency based on the designation (ST19).

Since the frequency is f1 at the time when the mobile station M reaches the cell b of FIG. 5, the mobile station M executes the peripheral cell search using the frequency f1. This can detect a mobile designation cell c. As a result, the network (control station C) can designate the soft handover from the cell b to the cell c based on the peripheral cell reception quality report from the mobile station M by the handover control section 117. Therefore, the above designation results in the soft handover state in the mobile station M (ST20).

Thereafter, the mobile direction determination section 115 of the control station C determines whether or not the cell movement is needed based on the peripheral cell reception quality report from the mobile station M. If it is determined that the cell movement is needed, that is, the mobile station M is moving to the cell c from the cell b, the control station C designates as follows. More specifically, the control station C designates the start of the forward link transmission to the mobile station M and that of the reverse link reception from the mobile station M with respect to the radio base station Bc offering a service of cells. Also, the control station C designates the start of the reception of the forward link from the radio base station Bb with respect to the mobile station M. Then, the control station C notifies the mobile station M of the spreading code used in the peripheral cells of the cell c after the mobile station M moves to the cell c.

Thus, before the mobile station M reaches the boundary of the area (in the same frequency area) where the same frequency can be used, the network detects that the mobile station is moving to the outer area of the same frequency. At this time, the control station designates the frequency change to the mobile station M in advance. As a result, the handover can be satisfactorily executed even between the cells each using a different frequency in a state that the receiving frequency in the peripheral cell search, which the mobile station executes for the handover, is limited to one.

Thus, according to the present invention, whether the mobile station is moving in the area where the same frequency can be used or the area where the same frequency cannot be used is determined in the network side. Then, the using frequency is changed in advance in the mobile station. As a result, even in a case where the frequency used in each region of the service area differs, the handover can be satisfactorily executed between the cells each using a different frequency.

INDUSTRIAL APPLICABILITY

The present invention can be suitably used in a digital radio communication system using a CDMA. Therefore, even in a case where the frequency used in each region of the service area differs, a handover can be satisfactorily executed.

What is claimed is:

1. A mobile station apparatus of a CDMA system comprising:
   a radio communication system that is capable of communicating using at least a first frequency and a second frequency;
   a received quality measuring system that measures received qualities of signals of the first frequency and the second frequency transmitted from adjacent cells using respective spreading codes assigned to the cells to perform cell searching; and
   a frequency change system that determines a second base station apparatus as a destination of handover based on the received qualities, and change frequency according to a frequency changes instruction signal that instructs a change from the first frequency to the second frequency, when a movement direction of said mobile station apparatus is from a cell of a first base station apparatus that uses the first frequency and the second frequency and is communicating with said mobile station apparatus using the first frequency, to a cell of said second base station apparatus which communicates using the second frequency,
   wherein the movement direction is determined from a result obtained by measuring the received qualities of signals transmitted from the adjacent cells using the respective spreading codes assigned to the cells, and said mobile station apparatus performs a soft handover from the cell of said first base station apparatus to the cell of said second base station apparatus determined based on the received qualities in said received quality measuring system, after changing the frequency.

2. The mobile station apparatus of a CDMA system according to claim 1, wherein said frequency change system changes the frequency according to the frequency change instruction signal when said mobile station apparatus is in a cell situated before the cell of said first base station apparatus in the movement direction.

3. A control station apparatus of a CDMA system comprising:
   a movement direction determination system that acquires, through a base station apparatus, a result of a periphery cell search obtained in a mobile station apparatus, by measuring received qualities of a plurality of signals transmitted from adjacent cells using at least one of a first frequency used by said base station apparatus to communicate with said mobile station apparatus, and a second frequency used by another base station apparatus as a candidate for destination of handover of said mobile station apparatus, each of said base station apparatus and said another base station apparatus using a respective one of spreading codes assigned to the cells, and that determines a movement direction of said mobile station apparatus based on the result of the periphery cell search;
   a frequency change instructing system that transmits a frequency change instruction signal for instructing said mobile station apparatus to change from the first frequency to the second frequency, when the movement direction of said mobile station apparatus is from a cell of a first base station with which said mobile station apparatus is communicating using the first frequency to a cell of a second base station apparatus which communicates using the second frequency; and
   a handover control system that performs a soft handover of said mobile station apparatus from the cell of said first base station apparatus to the cell of said second base station apparatus determined based on the received qualities of the signals transmitted from the cells measured in said mobile station apparatus, after changing the frequency of said mobile station apparatus.

4. The control station apparatus of a CDMA system according to claim 3, wherein said frequency change instructing system transmits the frequency change instruction signal to said mobile station apparatus when said mobile station apparatus is in a cell situated before the cell of said first base station apparatus in the movement direction.

5. The control station apparatus of a CDMA system according to claim 3, further comprising:
   a same frequency area determination system that determines whether or not the first frequency being used in a current communication is capable of being used in a cell of a base station apparatus existing in the movement direction determined by said movement direction determination system,
   wherein said frequency change instructing system transmits the frequency change instruction signal to said mobile station apparatus according to a result determined by said same frequency area determination system.

6. The control station apparatus of a CDMA system according to claim 5, wherein said same frequency area determination system comprises a station location storage system that stores a use frequency of each base station apparatus, and compares the use frequency of each base station apparatus stored in said station location storage system with the first frequency being used in the current communication to determine whether or not the first frequency is capable of being used in the cell of the base station apparatus located in the movement direction.

7. A radio communication method of a CDMA system comprising:

measuring, in a mobile station apparatus, received qualities of signals of a first frequency used by the mobile station in communicating and a second frequency used by a base station apparatus as a candidate for destination of handover of the mobile station apparatus, transmitted from adjacent cells using respective spreading codes assigned to the cells;

determining whether a movement direction of the mobile station apparatus is from a cell of a first base station apparatus which uses the first frequency and the second frequency and is communicating with the mobile station apparatus using the first frequency to a cell of a second base station apparatus which communicates using the second frequency;

changing a communication frequency of the mobile station apparatus from the first frequency to the second frequency when a movement is detected in the movement direction from the cell of the first base station apparatus to the cell of the second base station apparatus determined based on a measurement result of the received qualities; and performing a soft handover of the mobile station apparatus from the cell of the first base station apparatus where the mobile station apparatus has changed the frequency to the cell of the second base station apparatus.

8. The radio communication method of a CDMA system according to claim 7, wherein during changing of the communication frequency of the mobile station apparatus from the first frequency to the second frequency, when a control station apparatus determines the movement direction of the mobile station apparatus based on a cell search result report from the mobile station apparatus and the first frequency with which the mobile station apparatus is currently communicating is not used in the cell of the second base station apparatus located in the movement direction, a frequency change instruction signal is transmitted to the mobile station apparatus when the mobile station apparatus is in a cell situated before the cell of the first base station apparatus in the movement direction.

* * * * *

UNITED STATES PATENT AND TRADEMARK OFFICE
CERTIFICATE OF CORRECTION

PATENT NO. : 6,633,556 B1 Page 1 of 1
DATED : October 14, 2003
INVENTOR(S) : T. Sato

It is certified that error appears in the above-identified patent and that said Letters Patent is hereby corrected as shown below:

<u>Title page,</u>
Item [57], ABSTRACT,
Line 10, after "mobile station" insert -- M. --.

<u>Column 9,</u>
Line 47, "change" should be -- changes --.
Line 48, "changes" should be -- change --.

Signed and Sealed this

Sixteenth Day of March, 2004

JON W. DUDAS
*Acting Director of the United States Patent and Trademark Office*